(12) United States Patent
Miyauchi

(10) Patent No.: US 8,521,423 B2
(45) Date of Patent: Aug. 27, 2013

(54) IN-VEHICLE DISPLAY APPARATUS

(75) Inventor: Hideo Miyauchi, Obu (JP)

(73) Assignee: Denso Corporation, Kariya (JP)

(*) Notice: Subject to any disclaimer, the term of this patent is extended or adjusted under 35 U.S.C. 154(b) by 0 days.

(21) Appl. No.: 13/581,552

(22) PCT Filed: Feb. 21, 2012

(86) PCT No.: PCT/JP2012/001128
§ 371 (c)(1),
(2), (4) Date: Aug. 28, 2012

(87) PCT Pub. No.: WO2012/127776
PCT Pub. Date: Sep. 27, 2012

(65) Prior Publication Data
US 2013/0103256 A1     Apr. 25, 2013

(30) Foreign Application Priority Data

Mar. 23, 2011 (JP) .................................. 2011-64728
Oct. 28, 2011 (JP) ................................. 2011-237769

(51) Int. Cl.
*G01C 21/32* (2006.01)
(52) U.S. Cl.
USPC .......................... 701/432; 340/995.1; 345/1.1
(58) Field of Classification Search
USPC ................ 701/36, 432; 345/1.1, 9; 340/988, 340/989, 990, 993, 995.1, 995.11, 995.12, 340/995.14, 995.15, 995.17, 995.19, 995.2, 340/995.24, 995.27
See application file for complete search history.

(56) References Cited

U.S. PATENT DOCUMENTS

2003/0156097 A1    8/2003   Kakihara et al.
2010/0220250 A1    9/2010   Vanderwall et al.

FOREIGN PATENT DOCUMENTS

| JP | 6-76065 A | 3/1994 |
| JP | 2003-244343 | 8/2003 |
| JP | 2005-284886 A | 10/2005 |
| JP | 2009-210432 A | 9/2009 |
| JP | 2010-109707 A | 5/2010 |
| JP | 2010-514604 A | 5/2010 |
| JP | 2010-127781 | 6/2010 |
| JP | 2010-130553 A | 6/2010 |
| JP | 2010-205160 A | 9/2010 |

OTHER PUBLICATIONS

International Search Report and Written Opinion of the ISA, ISA/JP, for PCT/JP2012/001128 mailed Apr. 3, 2012.

*Primary Examiner* — Helal A Algahaim
*Assistant Examiner* — Genna Mott
(74) *Attorney, Agent, or Firm* — Harness, Dickey & Pierce, PLC

(57) ABSTRACT

An in-vehicle display apparatus, which is coupled to a terminal device having a terminal display section, includes an in-vehicle display section equipped to a vehicle and a display controller. The display controller controls the in-vehicle display section to display a pseudo terminal display window, which indicates a terminal display window displayed on the terminal display section of the terminal device. The display controller controls the in vehicle display section to display the pseudo terminal display window, which includes a specified region and another region other than the specified region in such a manner that the specified region is scaled up compared with the another region. Thus, the specified region is easily confirmed and the pseudo terminal display window displays a broader scope thereby reducing display loss of necessary information.

11 Claims, 7 Drawing Sheets

IN-VEHICLE DISPLAY APPARATUS

CROSS-REFERENCE TO RELATED APPLICATIONS

This application is a 371 U.S. National Stage of International Application No. PCT/JP2012/001128, filed Feb. 21, 2012. This application claims priority to Japanese Patent Applications No. 2011-64728, filed Mar. 23, 2011 and 2011-237769, filed Oct. 28, 2011. The entire disclosures of the above applications are incorporated herein by reference.

TECHNICAL FIELD

The present disclosure relates to an in-vehicle display apparatus.

BACKGROUND ART

As an in-vehicle display apparatus, an apparatus for displaying a display window of an external terminal device is well known. An apparatus disclosed in patent literature 1 is one example of the above-described in-vehicle display apparatus. The in-vehicle display apparatus disclosed in patent literature 1 displays a display window of a mobile terminal on an in-vehicle display section. Further, in patent literature 1, the in-vehicle display apparatus obtains display region information (i.e., display window size) of the mobile terminal, and compares the display region information of the mobile terminal with a display window size of the in-vehicle display section in order to decide a scale factor for converting the display window of the mobile terminal to a display window of the in-vehicle display section. Further, patent literature 1 discloses an example of a display mode, in which one or more display windows are converted by different scale factors. Patent literature 1 also discloses examples of display modes, in which the display window of the mobile terminal is displayed in a scale-down manner so that the display window of the mobile terminal is completely displayed on the in-vehicle display section or the display window of the mobile terminal is displayed in a scale-up manner. In a case where the display window of the mobile terminal is displayed in the scale-up manner, the display window of the mobile terminal fails to be completely displayed on the in-vehicle display section. Thus, patent literature 1 discloses that a scroll button is prepared in order to completely display the display window of the mobile terminal on the in-vehicle display section.

In patent literature 1, the display window of the mobile terminal is displayed on the in-vehicle display section by converting the entire display window of the mobile terminal by a predetermined horizontal to vertical scale factor. In patent literature 1, in order to display the entire display window of the mobile terminal on the in-vehicle display section, the entire display window of the mobile terminal is scaled down. Thus, the display window of the mobile terminal is difficult to be identified in detail in a short time. In order to easily identify the display window displayed on the in-vehicle display section in detail, the entire display window needs to be scaled up. However, when scaled up, the display window of the mobile terminal fails to be completely displayed on the in-vehicle display section at one time. Thus, the entire display window of the mobile terminal, which is displayed on the in-vehicle display section, cannot be confirmed without scrolling the display window on the in-vehicle display section.

PRIOR ART LITERATURES

Patent Literature

Patent Literature 1: JP-A-2010-130553

SUMMARY OF INVENTION

In view of the foregoing difficulties, it is an object of the present disclosure to provide an in-vehicle display apparatus, which displays a display window of a terminal device on a display section of the in-vehicle display apparatus so that an entire portion and a necessary portion of the display window of the terminal device is easy to be confirmed on the display section of the in-vehicle display apparatus.

According to an aspect of the present disclosure, an in-vehicle display apparatus includes an in-vehicle display section equipped to a vehicle and a display controller. The display controller controls the in-vehicle display section to display a pseudo terminal display window, which indicates a terminal display window displayed on the terminal display section of the terminal device. The display controller controls the in-vehicle display section to display the pseudo terminal display window, which includes a specified region and another region other than the specified region, in such a manner that the specified region is scaled up compared with the another region.

In the above apparatus, the pseudo terminal display window is displayed on the in-vehicle display section in such a manner that the specified region is scaled up compared with the another region. Thus, the specified region is confirmed easily. Further, the another region has a smaller scale factor than a scale factor of the specified region. Thus, comparing with a case where the entire region of the terminal display window is scaled up by the same scale factor, the pseudo terminal display window displays a broader scope of the terminal display window, thereby reducing a display loss of necessary information.

According to another aspect of the present disclosure, a method for displaying a terminal display window, which has been displayed on a terminal display section of a terminal device, on an in-vehicle display section of an in-vehicle display apparatus coupled to the terminal device includes: obtaining pixel information of the terminal display window transmitted from the terminal display section of the terminal device; identifying a scale-up mark for defining a specified region according to the pixel information; determining whether the scale-up mark is identified according to a result of the identifying of the scale-up mark; determining whether the in-vehicle display section has an available region, when determining that the scale-up mark is identified; displaying an entire pseudo terminal display window, which indicates an entire region of the terminal display window, on the in-vehicle display section of the in-vehicle display apparatus, when determining that the scale-up mark is not identified; displaying the entire pseudo terminal display window, which indicates the entire region of the terminal display window, on the in-vehicle display section of the in-vehicle display apparatus, and displaying a scaled-up specified region display window, which is prepared by scaling-up the specified region displayed in the entire pseudo terminal display window to be larger than the specified region displayed in the entire pseudo terminal display window, in the available region, which is not overlapped with the entire pseudo terminal display window, when determining that the in-vehicle display section of the in-vehicle display apparatus has the available region; and displaying the entire pseudo terminal display window, which indicates the entire region of the terminal display window, on the in-vehicle display section of the in-vehicle display apparatus, and displaying the scaled-up specified region display window, which is prepared by scaling-up the specified region displayed in the entire pseudo terminal display window to be larger than the specified region displayed in the entire pseudo terminal display window, in such a manner that the scaled-up specified region display window is overlapped with the entire pseudo terminal display window, when determining that the in-vehicle display section of the in-vehicle display apparatus does not have the available region.

In the above method, the scaled-up specified region display window is prepared by scaling-up the specified region in the entire pseudo terminal display window to be larger than the specified region in the entire pseudo terminal display window, and is displayed on the in-vehicle display section. Thus, the specified region is confirmed easily. Further, comparing with a case where the entire region of the terminal display window is scaled up by the same scale factor, the pseudo terminal display window displays a broader scope of the terminal display window, thereby reducing a display loss of necessary information.

BRIEF DESCRIPTION OF DRAWINGS

The above and other objects, features and advantages of the present disclosure will become more apparent from the following detailed description made with reference to the accompanying drawings. In the drawings.

EMBODIMENTS FOR CARRYING OUT INVENTION

First Embodiment

Figure 1:
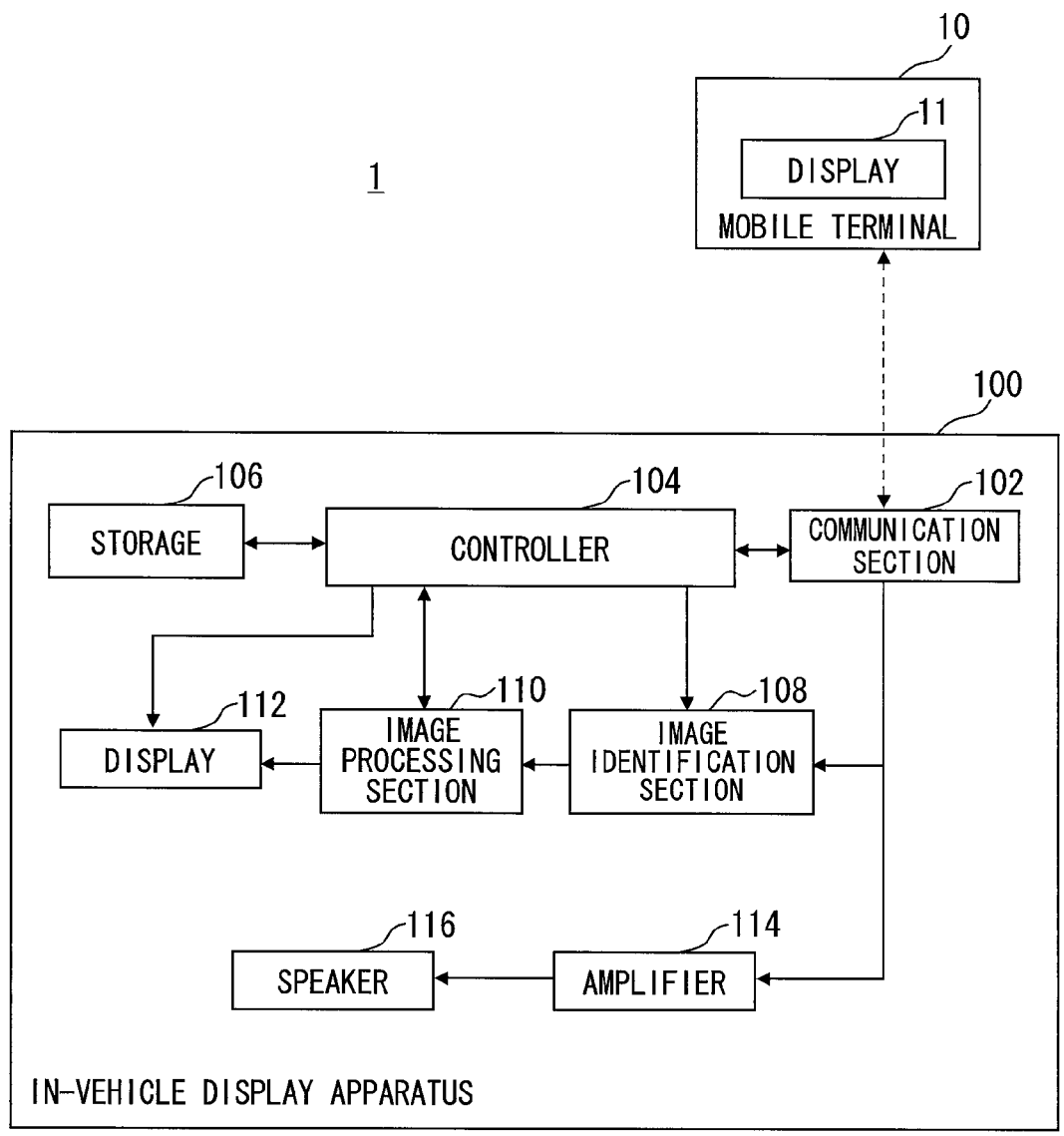
FIG. 1 is a block diagram showing a configuration of a display system 1 according to the present disclosure.

Embodiments of the present disclosure will be described with reference to drawings. FIG. 1 shows a configuration of a display system 1 for displaying a display window of a terminal device. As shown in FIG. 1, the display system 1 includes an in-vehicle display apparatus 100, which will be described in the present disclosure and a mobile terminal 10.

The mobile terminal 10 corresponds to the terminal device. The mobile terminal 10 may be a well-known smart phone, a mobile phone other than the smart phone, or a personal digital assistance (PDA). The mobile terminal 10 includes a terminal display section 11. Further, the mobile terminal 10 includes a CPU, a ROM, and a RAM, which are arranged an inside (not shown) of the mobile terminal 10. The ROM stores various application programs. The CPU executes the application programs stored in the ROM so that various display windows are displayed on the terminal display section 11. Hereinafter, the display window displayed on the terminal display section 11 is referred to as a terminal display window.

The mobile terminal 10 may have different types and may execute different applications. Thus, the mobile terminal 10 displays various terminal display windows on the terminal display section 11. In the present embodiment, a specified region of the terminal display window includes a scale-up mark having a predetermined color or a predetermined shape. The specified region of the terminal display window is to be displayed in a scale-up manner on a display section 112 of the in-vehicle display apparatus 100. The in-vehicle display apparatus 100 defines the specified region of the terminal display window by identifying the scale-up mark. Specifically, the in-vehicle display apparatus 100 identifies the scale-up mark by analyzing pixel information transmitted from the mobile terminal 10.

The scale-up mark may have a predetermined color only, a predetermined shape only, or both a predetermined color and a predetermined shape. One example of the predetermined shape is a frame. The frame used as the scale-up mark needs to be set to a frame, which is used infrequently in a normal drawing. For example, the frame used as the scale-up mark may have a line type and a color, which are infrequently used in the normal drawing. Setting a frame as the scale-up mark is relatively easier than setting another shape as the scale-up mark. Specifically, in a case where an existing application has no frame, the frame only needs to be added to a terminal display window of the application, and in a case where an existing application already has a terminal display window with a frame, the existing frame needs to be changed.

The mobile terminal 10 is communicable with the in-vehicle display apparatus 100 via a wire communication or a wireless communication. For example, a wire coupling may include a communication via a universal serial bus (USB) cable, and a wireless coupling may include a Bluetooth (registered trademark) communication. Under a condition that the mobile terminal 10 is communicably coupled with the in-vehicle display apparatus 100, the mobile terminal 10 transmits pixel information of the terminal display window, which is displayed on the terminal display section 11, to the in-vehicle display apparatus 100 in a sequential manner. The pixel information of the terminal display window includes color information of each pixel.

The following will describe an order of setting up a communication. First, the in-vehicle display apparatus 100 transmits an inquiry signal, for example, when a power supply is turned on, that is, ACC is turned to ON. The inquiry signal inquires an existence of a terminal, which enables a transmission of an image signal via a wire communication or a wireless communication. When receiving a response to the inquiry signal, the in-vehicle display apparatus 100 further transmits a coupling request signal. When the mobile terminal 10 responds to the coupling request signal, a communication between the in-vehicle display apparatus 100 and the mobile terminal 10 is set up. The following will describe a case in which the inquiry signal is responded by one or more mobile terminals 10. In this case, the in-vehicle display apparatus 100 assigns a highest priority to one of the one or more mobile terminals 10 according to various indexes so that a communication is set up between the in-vehicle display apparatus 100 and the mobile terminal 10 having the highest priority. For example, indexes referenced for deciding the priority may include a user-set priority, a radio field intensity, and a remaining battery power. Specifically, the highest priority corresponds to the highest user-set priority, the strongest radio field intensity, or the most remaining battery power.

When the communication is set up, the in-vehicle display apparatus 100 transmits an image request signal, which requests a transmission of the image signal, to the mobile terminal 10 so that the image signal is transmitted from the mobile terminal 10 to the in-vehicle display apparatus 100.

The in-vehicle display apparatus 100 includes a communication section 102, a controller 104, a storage 106, an image identification section 108, an image processor 110, the display section 112, an amplifier 114, and a speaker 116. The communication section 102 is communicable with the mobile terminal 10 via a wire communication or a wireless communication. The communication section 102 receives an image signal and an audio signal transmitted from the mobile terminal 10. The pixel information is transmitted from the mobile terminal 10 included in the image signal. The communication section 102 separates the received image signal from the received audio signal, and transmits the image signal and the audio signal to the image identification section 108 and the amplifier 114, respectively.

The controller 104 controls an operation of the in-vehicle display apparatus 100 including the communication section 102, the image identification section 108, the image processor 110, and the display section 112. The storage 106 stores a scale-up mark. As described above, a frame may be used as the scale-up mark. Alternatively, a predetermined character, and a predetermined mark (such as an arrow and a facility mark) may be used as the scale-up mark.

The image identification section 108 corresponds to a mark detector. The image identification section 108 obtains pixel information from the communication section 102 according to an instruction from the controller 104, and executes an image identification process according to the obtained pixel information. Specifically, the image identification process is executed in such a manner that the image identification section 108 obtains a scale-up mark list stored in the storage 106 via the controller 104, and detects the scale-up mark from the received pixel information referring to the scale-up mark list. When the scale-up mark stored in the scale-up mark list is defined by the predetermined shape, the image identification section 108 detects shapes of various marks included in the terminal display window according to a color change in the terminal display window. The color change in the terminal display window is defined by the pixel information. Then, the image identification section 108 compares a shape of a mark detected from the terminal display window with the predetermined shape of the scale-up mark stored in the scale-up mark list in order to identify whether the detected mark is the scale-up mark. When the scale-up mark stored in the scale-up mark list is defined by a predetermined color, the image identification section 108 identifies the scale-up mark from the terminal display window according to color information included in the pixel information. The image identification section 108 transmits an identification result and pixel information, which is identified as described above, to the image processor 110. When executing the image identification process, widely known technologies for image identification may be used. For example, a connected portion having the same color in an image may be identified as one mark. Further, when the detected mark has a closed line-shape, the mark may be identified as a frame of another mark and the frame and entire internal portion of the frame may be identified as one mark. Further, when the image identification section 108 detects a mark according to color, the image identification section 108 may further identify a color of a frame of the detected mark and a color of an internal portion of the detected mark. When the mark including the frame and the internal portion has one or more different colors, the image identification section 108 may identify the mark by a color, which occupies the mark by a ratio higher than a predetermined ratio.

The image processor 110 also corresponds to a display controller. The image processor 110 prepares a pseudo terminal display window according to pixel information transmitted from the image identification section 108, and displays the prepared pseudo terminal display window on the display section 112 of the in-vehicle display apparatus 100. The pseudo terminal display window is an image prepared for indicating the terminal display window. The pseudo terminal display window may be prepared to incompletely display the terminal display window. Specifically, the pseudo terminal display window may be prepared by scaling up the entire terminal display window by a predetermined scale-up factor or scaling down the entire terminal display window by a predetermined scale-down factor. The predetermined scale-up factor and the predetermined scale-down factor are decided according to a difference between horizontal to vertical pixels of the terminal display section 11 and horizontal to vertical pixels of the display section 112 of the in-vehicle display apparatus 100. Further, the pseudo terminal display window may also be prepared by converting the entire terminal display window by a predetermined horizontal to vertical ratio. In a case where general pixel information, such as total pixels and a horizontal to vertical ratio, is transmitted from the mobile terminal 10 with the pixel information, the predetermined scale-up factor, the predetermined scale-down factor, or the predetermined horizontal to vertical ratio may be decided according to the general pixel information.

Further, in the present embodiment, the image processor 110 defines a type of the pseudo terminal display window according to available region of the display section 112 of the in-vehicle display apparatus 100. When the display section 112 has sufficient available region for displaying two types of the pseudo terminal display window, the image processor 110 prepares one type of pseudo terminal display window differently from another type of pseudo terminal display window. Specifically, when the display section 112 has sufficient available region for displaying the two types of the pseudo terminal display windows, the image processor prepares an entire pseudo terminal display window and a scaled-up specified region display window as two types of the pseudo terminal display windows. The entire pseudo terminal display window, which indicates the entire terminal display window, is prepared by multiplying the entire terminal display window by a predetermined scale factor. The scaled-up specified region display window, which indicates the specified region, is prepared by scaling up the specified region displayed in the entire pseudo display window by a predetermined scale factor greater than the predetermined scale factor by which the entire terminal display window is multiplied. The scaled-up specified region display window includes one or more sub display windows and is prepared by multiplying the specified region, which includes one or more sub specified regions respectively defined by one or more mark items of the scale-up mark. The entire pseudo terminal display window and the scaled-up specified region display window are displayed on the display section 112 with no overlap.

Further, when the display section 112 does not have the sufficient available region for displaying the two types of the pseudo terminal display windows, the image processor 110 prepares a pseudo terminal display window in which the scaled-up specified region display window is displayed on the entire pseudo terminal display window in an overlapped manner with the specified region as an overlap center. Then, the pseudo terminal display window is displayed on the display section 112.

Further, a predetermined scale-up mark defines a corresponding specified region. For example, a frame, which is used as the scale-up mark, defines a portion surrounded by the frame as a corresponding specified region. Further, a character, which is used as the scale-up mark, defines a portion occupied by the character or a blank portion other than the portion occupied by the character as a corresponding specified region. The specified region may be scaled up by multiplying the predetermined scale-up factor or may be scaled up to a predetermined size. A scale-up method including multiplying the predetermined scale-up factor and scaling up to the predetermined size may be set differently according to the scale-up mark. Further, when scaling up the specified region, the horizontal to vertical ratio of the specified region may be changed to a predetermined horizontal to vertical ratio.

The display section 112 is disposed in a vehicle visible to a user, and displays the above-described pseudo terminal display window. For example, a display screen equipped to a well-known navigation device may be used as the display section 112. The amplifier 114 amplifies the audio signal, which is transmitted from the communication section 102, and inputs the amplified audio signal to the speaker 116. The speaker converts the amplified audio signal (electric signal) to an audible voice or an audible sound.

Figure 2:
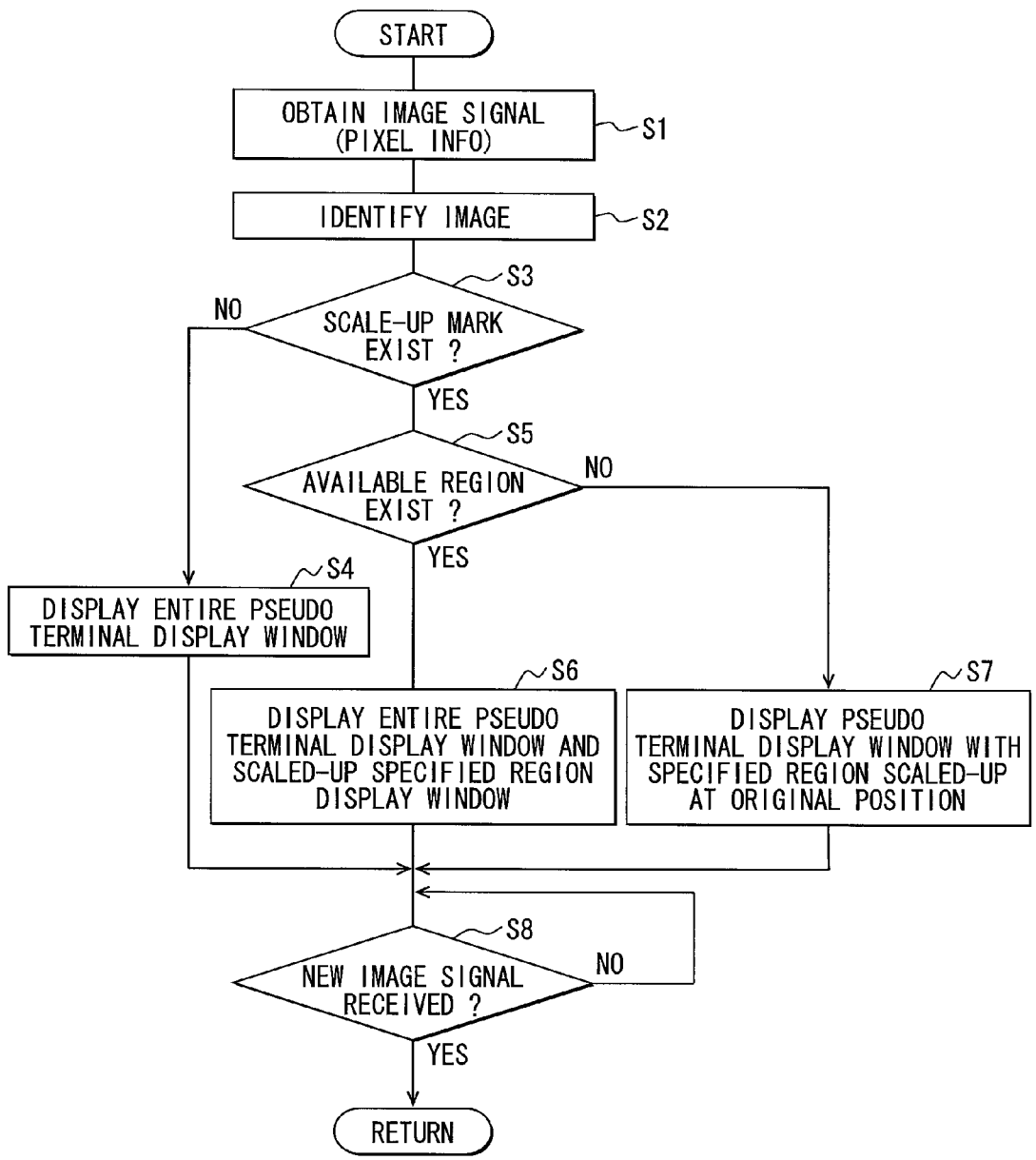
FIG. 2 is a flowchart showing a control process executed by an in-vehicle display apparatus 100.

FIG. 2 is a flowchart showing a control process executed by the in-vehicle display apparatus 100. The following will describe the control process executed by the in-vehicle display apparatus 100 with reference to FIG. 2. The control process shown in FIG. 2 is executed under a condition that the communication between the in-vehicle display apparatus 100 and the mobile terminal 10 is set up, and the pixel information being transmitted in the sequential manner from the mobile terminal 10 to the in-vehicle display apparatus 100.

First, at step S1, the image identification section 108 obtains the image signal (pixel information) from the communication section 102. The image signal is transmitted from the mobile terminal 10 to the communication section 102. Then, the image identification section 108 performs an image identification process for identifying the scale-up mark included in the terminal display window referring to the scale-up mark list stored in the storage 106.

Thereafter, the image processor 110 executes step S3 to step S7. At step S3, the image processor 110 determines whether the scale-up mark is included in the terminal display window according to an image identification result at step S2. When a determination at step S3 is "NO", it proceeds to step S4. When the determination at step S3 is "YES", it proceeds to step S5. At step S4, the entire pseudo terminal display window is displayed on the display section 112.

At step S5, the image processor 110 determines whether the display section 112 has sufficient available region for displaying the two types of the pseudo terminal display windows. When a determination at step S5 is "YES", it proceeds to step S6. When the determination at step S5 is "NO", it proceeds to step S7. At step S6, the image processor 110 displays the entire pseudo terminal display window and the scaled-up specified region display window on the display section 112 with no overlap. At step S7, the image processor 110 displays the pseudo terminal display window with a scale-up specified region, which is scaled up at an original position. That is, the image processor 110 displays the scaled-up specified region display window on the entire pseudo terminal display window in the overlapped manner.

At step S8, the controller 104 determines whether a new image signal is received. When a determination at step S8 is "NO", step S8 is executed repeatedly. When the determination at step S8 is "YES", the control process returns to step S1.

Figure 3A:
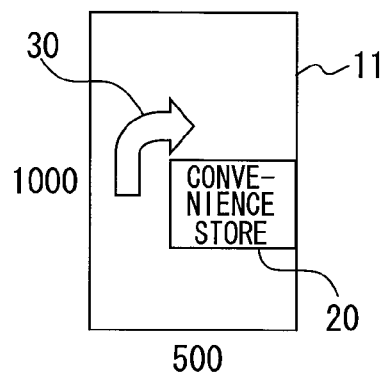
FIG. 3A to FIG. 3E are diagrams exemplarily showing display windows displayed on a display section 112 at step S4, step S5, step S6 of FIG. 2, respectively.
Figure 3B:
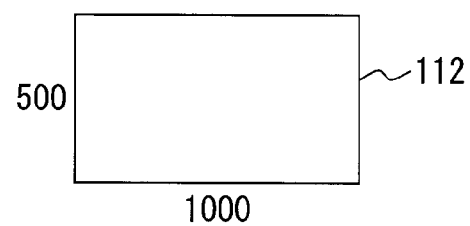

Examples of the display windows displayed on the display section 112 at step S4, step S5, step S6 will be described with reference to FIG. 3A to FIG. 3E. FIG. 3A is a diagram showing the terminal display window displayed on the terminal display section 11. The terminal display window shown in FIG. 3A guides a route, specifically, displays a right-turn position in the scale-up manner. In this terminal display window, a facility mark 20 indicative of a convenience store and a right-turn arrow 30 are displayed. As shown in FIG. 3A, the terminal display section 11 of the mobile terminal 10 has 1000 pixels in a vertical direction and 500 pixels in a horizontal direction. FIG. 3B is a diagram showing the display section 112 of the in-vehicle display apparatus 100. As shown in FIG. 3B, the display section 112 has 500 pixels in the vertical direction and 1000 pixels in the horizontal direction.

Figure 3C:
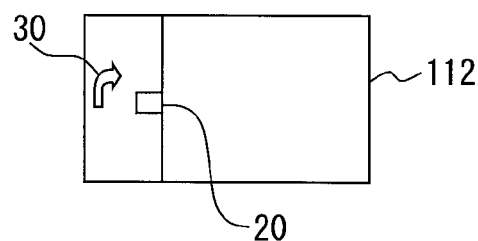
Figure 3D:
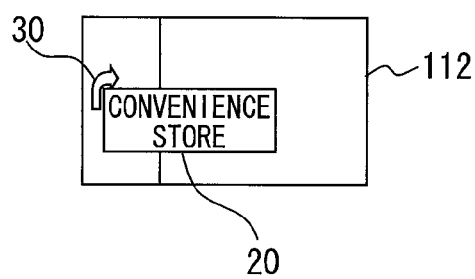
Figure 3E:
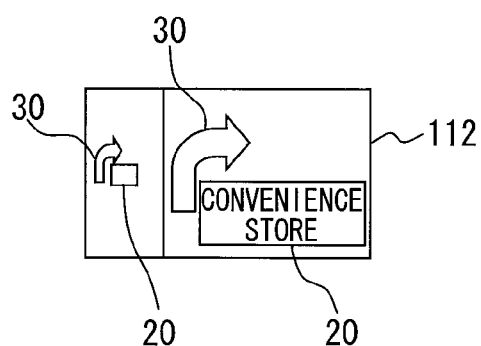

FIG. 3C is a diagram exemplarily showing that the pseudo terminal display window, which is prepared based on the terminal display window, is displayed on the display section 112 of the in-vehicle display apparatus 100. The pixels of the pseudo terminal display window are changed to 500 pixels in the vertical direction and 250 pixels in the horizontal direction according to a difference between the horizontal to vertical ratio of the terminal display window and the horizontal to vertical ratio of the display section 112 of the in-vehicle display apparatus 100. At step S4, a display window exemplarily shown in FIG. 3C is displayed on the display section 112. As shown in FIG. 3C, the pseudo terminal display window displayed on the display section 112 is quite small and is hard to be read. When information of a route guidance position is hard to be read, a driving of a vehicle may be affected. Further, as shown in FIG. 3D and FIG. 3E, the facility mark 20 and the right-turn arrow 30 are objects to be displayed in the scale-up manner, which need to be displayed in the scale-up manner. In FIG. 3C, the facility mark 20 and the right-turn arrow 30 are displayed without scale-up for comparison.

Compared with FIG. 3C, in the pseudo terminal display window displayed in FIG. 3D, the facility mark 20 and the right-turn arrow 30 are scaled up at step S7 and displayed. Thus, the facility mark 20 and the right-turn arrow 30 can be read in a short time. Further, since the facility mark 20 and the right-turn arrow 30 are displayed in the scale-up manner at the respective original positions, a decrease in a display region for displaying windows other than the scaled-up specified region display window is suppressed.

FIG. 3E is a diagram exemplarily showing the pseudo terminal display window displayed at step S6. In the pseudo terminal display window displayed at step S6, the entire pseudo terminal display window and the scaled-up specified region display window are displayed with no overlap. The scaled-up specified region display window is displayed on a right side of the entire pseudo terminal display window. In FIG. 3E, since the scaled-up specified region display window is displayed, the facility mark 20 and the right-turn arrow 30 can be read in a short time. Further, in FIG. 3E, the scaled-up specified region display window is displayed separately from the entire pseudo terminal display window. Thus, in the entire pseudo terminal display window, an invisibility of a region around the specified region is avoided. Further, the specified region in the entire pseudo terminal display window is scaled up by the same scale-up factor with the region other than the specified region in the entire pseudo terminal display window. Thus, the specified region in the entire pseudo terminal display window is easy to be identified by displaying the specified region as the scaled-up specified region display window.

As described above, according to the first embodiment, when the terminal display window includes the specified region, the pseudo terminal display window is displayed on the display section 112 in such a manner that the specified region is scaled up by the greater scale-up factor than the scale-up factor of the region other than the specified region. Thus, the specified region is easy to be identified. Further, the region other than the specified region is scaled up by the scale-up factor smaller than the scale-up factor of the specified region. Thus, the pseudo terminal display window displays a broader scope of the terminal display window compared with a case in which the entire terminal display window is scaled up by the same scale-up factor. Thus, display loss of necessary information is reduced.

Further, according to the first embodiment, the specified region defined by the scale-up mark is displayed in the scale-up manner. The scale-up mark is detected according to the pixel information. Thus, even when the mobile terminal 10 is in a terminal mode and transmits only pixel information, the pseudo terminal display window can be partially scaled up.

Second Embodiment

A second embodiment of the present disclosure will be described. In the second embodiment, a display of the scaled-up specified region display window on an available region of the display section 112 is different from the first embodiment. That is, step S6 and process to step S6 in FIG. 2 are different from the first embodiment. Other processes and a configuration of the in-vehicle display apparatus 100 are the same with the first embodiment.

In the second embodiment, a type of the scale-up mark displayed in the scaled-up specified region display window is settable. Further, a size of each sub display window of the scaled-up specified region display window is defined according to the number of the mark items of the scale-up mark and the types of the scale-up mark. Furthermore, a definition of the scale-up mark is settable by the user. The types of the scale-up mark and the definition of the scale-up mark are settable via an input device (not shown). For example, a touch panel integrated with the display section 112 may be used as the input device.

Figure 5:
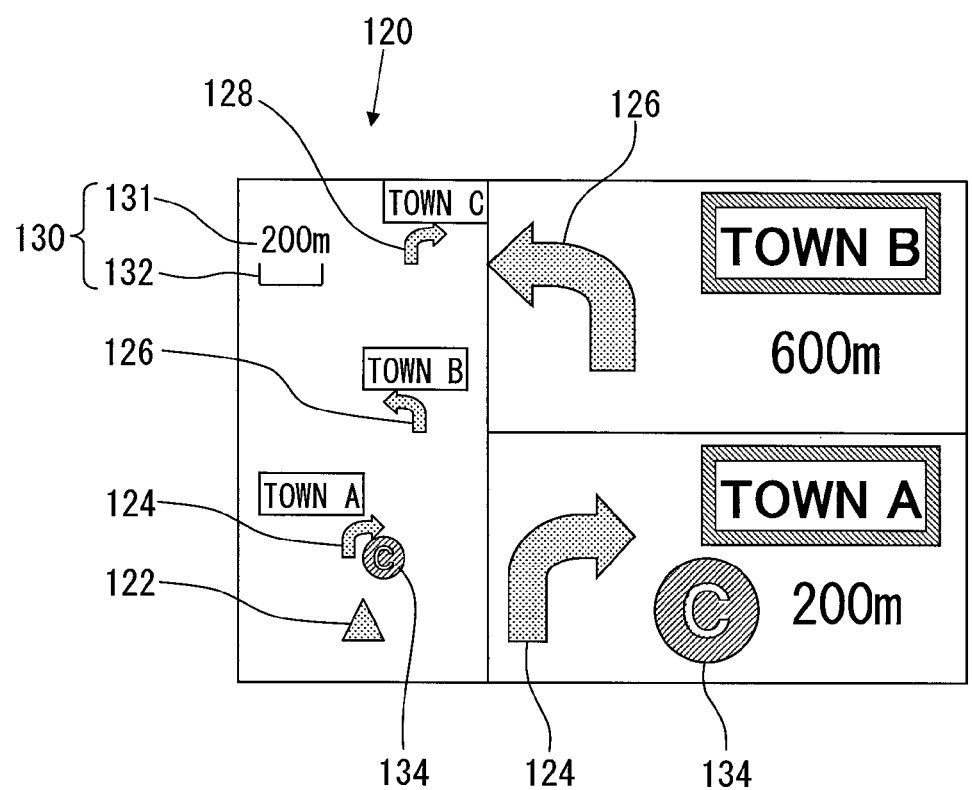
FIG. 5 is a diagram showing the display section 112 in a case where the display section displays meandering arrows, landmarks, characters of place-names in a scale-up manner on one scaled-up specified region display window.

With reference to FIG. 5, a case in which a meandering arrow indicative of a route direction change position, a landmark and characters of a place-name displayed around the meandering arrow are displayed in one sub display window of the scaled-up specified region display window will be described. Further, with reference to FIG. 7, a case in which only the meandering arrow is defined as the scale-up mark will be described. The meandering arrow corresponds to a route direction change mark, the landmarks and the characters of the place-name displayed around the meandering arrow correspond to mark items of the route direction change position periphery mark.

Figure 4:
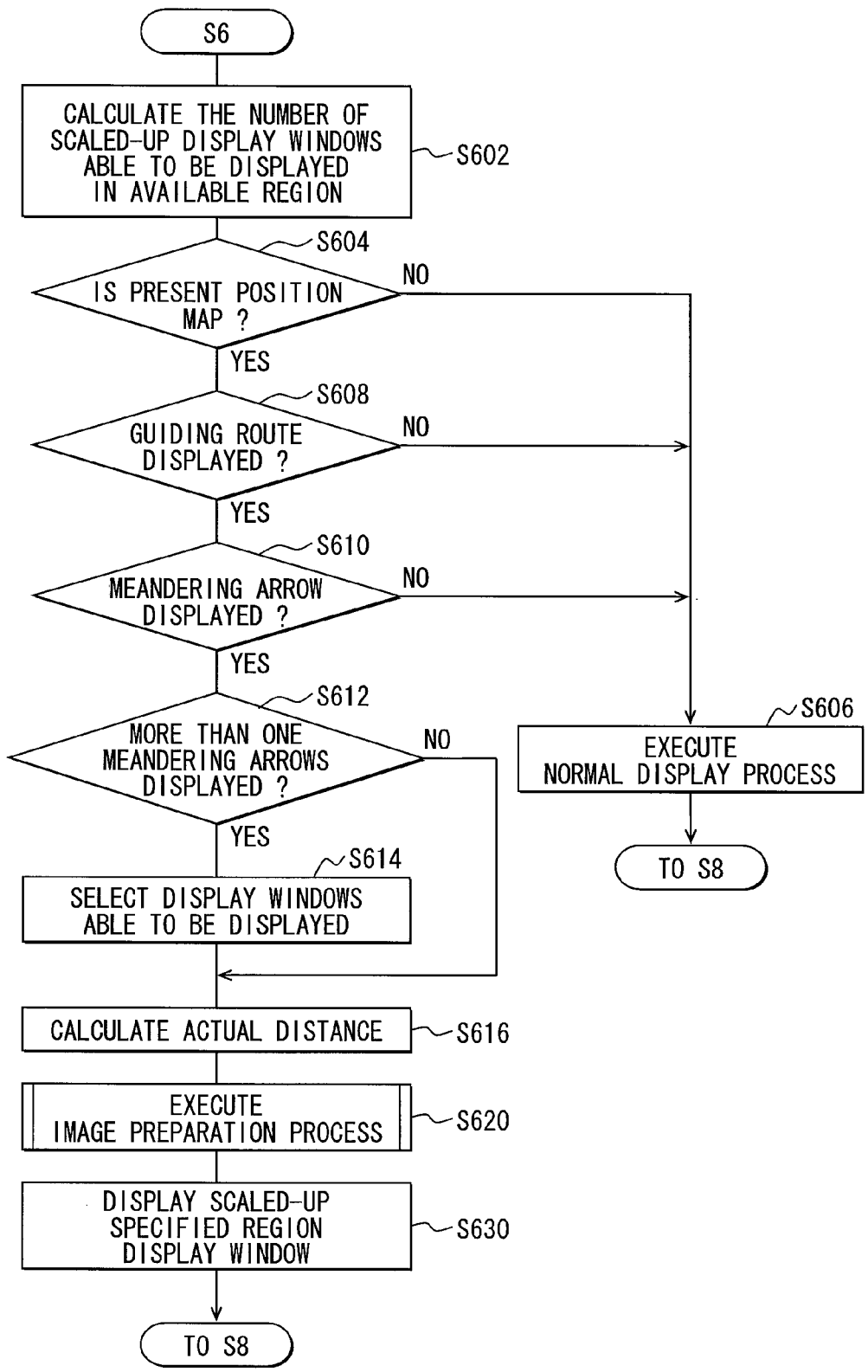
FIG. 4 is a flowchart showing a detailed process executed at step S6 of FIG. 2 according to a second embodiment.

FIG. 4 is a flowchart showing detailed process executed at step S6 in FIG. 2 according to the second embodiment. Step S6 is executed under a condition that step S3 and step S5 are determined to "YES". That is, step S6 is executed under a condition that the scale-up mark is detected and the display section 112 has sufficient available region for displaying the scaled-up specified region display window.

As shown in FIG. 4, at step S602, the image processor 110 calculates the number of the sub display windows of the scaled-up specified region display window able to be displayed in the available region of the display section 112. Specifically, first, the image processor 110 prepares the entire pseudo terminal display window by multiplying the entire terminal display window by the same scale-up factor in the horizontal direction and in the vertical direction. The scale-up factor is defined in such a manner that the entire pseudo terminal display window is displayed on the display section 112 at a maximum size. The available region of the display section is a remaining region of the display section 112 when the prepared entire pseudo terminal display window is displayed at a predetermined position of the display section 112. Then, a size of the available region is calculated.

Further, a size of the sub display window of the scaled-up specified region display window is defined. In the second embodiment, the size of the sub display window of the scaled-up specified region display window is defined according to the number of the mark items and the types of the scale-up mark to be displayed in one sub display window of the scaled-up specified region display window, and is not affected by the available region of the display section 112. Further, the sub display window of the scaled-up specified region display window is defined to have a rectangular shape irrespective of the number of the mark items and the types of the scale-up mark. A width of the sub display window of the scaled-up specified region display window in the vertical direction is defined according to the number of the mark items and the types of the scale-up mark.

Thereafter, the image processor 110 compares the size of the available region with the size of the sub display window of the scaled-up specified region display window. More specifically, the image processor 110 compares a vertical width of the available region and a vertical width of the sub display window of the scaled-up specified region display window in order to calculate the number of the sub display windows of the scaled-up specified region display windows able to be displayed in the available region of the display section 112.

At step S604, the image processor 110 further determines whether the terminal display window is a present position map including information of a present position of the vehicle. The present position map is a map including information of the present position of the vehicle. The image processor 110 determines whether the terminal display window is the present position map according to an existence or a non-existence of a present position mark in the terminal display window. The present position mark indicative of the present position may have one or more types and the one or more types of the present position mark are preliminarily stored in the storage 106. The image processor 110 determines whether any one type of the present position mark, which is preliminarily stored in the storage 106, is detected from the terminal display window.

When a determination at step S604 is "NO", it proceeds to step S606. At step S606, the image processor 110 executes a normal display process. The normal display process is a process executed when the terminal display window is not the present position map. Specifically, in the normal display process, the scaled-up specified region display window, which is defined by the scale-up mark and is identified via the image identification process executed at step S2, is displayed on the display section 112 in a different manner compared with a case where the terminal display window is the present position map. For example, in the normal display process, all the sub display windows of the scaled-up specified region display window are displayed in the available region of the display section 112 at one time. In this case, when the available region of the display section 112 is not sufficient for displaying all the sub display windows of the scaled-up specified region display window in predetermined sizes, each sub display window may be scaled down so that all the sub display windows of the scaled-up specified region display windows are displayed in the available region. Alternatively, the sub display windows of the scaled-up specified region display window may also be displayed with an overlap so that all the sub display windows of the scaled-up specified region display window are displayed in the available region. Alternatively, a predetermined priority may be set for each mark items of the scale-up mark, which defines a corresponding sub specified region, and the sub display windows of the scaled-up specified region display window may be selectively displayed according to the predetermined priority of each mark item of the scale-up mark. After executing the normal display process at step S606, it proceeds to step S8 in FIG. 2.

When the determination at step S604 is "YES", that is, the terminal display window is determined to be the present position map, it proceeds to step S608. At step S608, the image processor 110 determines whether the present position map displays a guiding route. Specifically, the image processor 110 determines whether the terminal display window displays a guiding route feature mark. A feature of the guiding route is preliminarily stored as the guiding route feature mark. Usually, a color used for the guiding route is aqua or blue, and the guiding route is displayed in a line-shape. Accordingly, the guiding route feature mark may be defined as a predetermined color, such as aqua and blue, or a predetermined shape, such as the line-shape. Step S604 and step S608 executed by the image processor 110 correspond to an image contents determination device.

In the present embodiment, when a determination at step S608 is "NO", a normal display process is executed at step S606. When the determination at step S608 is "YES", it proceeds to step S610. At step S610, the image processor 110 determines whether the terminal display window includes a meandering arrow around the guiding route. The meandering arrow corresponds to the route direction change mark for indicating the route direction change position, and is located in the guiding route or around the guiding route. In the second embodiment, the meandering arrow is stored in the scale-up mark list so that the meandering arrow is identified at image identification process executed at step S2. At step S610, the image processor 110 determines whether the meandering arrow is identified according to the image identification result of step S2. Further, marks other than the meandering arrow, for example, a meandering portion of the guiding route may be identified as the route direction change mark.

When a determination at step S610 is "NO", the normal display process is executed at step S606. When the determination at step S610 is "YES", it proceeds to step S612. At step S612, the image processor 110 determines whether the terminal display window displays more than one meandering arrows, each of which corresponds to the mark item of the scale-up mark. When a determination at step S612 is "NO", that is, when the terminal display window displays only one meandering arrow, it proceeds to step S616. When the determination at step S612 is "YES", that is, when the terminal display window displays more than one meandering arrows, it proceeds to step S614.

At step S614, the image processor 110 selects the sub display windows of the scaled-up specified region display windows able to be displayed in the available region of the display section 112. Specifically, the image processor 110 selects the sub display windows of the scaled-up specified region display windows according to the number, which is calculated at step S602. The sub display windows of the scaled-up specified region display window defined by the meandering arrows are selected in ascending order of a distance from the present position to each meandering arrow along a traveling direction of the guiding route.

FIG. 5 is a diagram exemplarily showing the display section 112 when step S614 and processes after step S614 are executed. In FIG. 5, an entire pseudo terminal display window 120, which has a vertically shape, is displayed on a left side of the display section 112. The present position map is displayed on the entire pseudo terminal display window 120. The entire pseudo terminal display window 120 includes a present position mark 122 and three meandering arrows 124, 126, 128. Further, in this example shown in FIG. 5, the predetermined number of the sub display windows of the scaled-up specified region display window is calculated as two. Thus, at step S614, the image processor 110 selects two sub display windows of the scaled-up specified region display window, which are respectively defined by the meandering arrows 124, 126 close to the present position mark 122. An entire pseudo terminal display window for practical use also displays a guiding route and roads. In FIG. 5, the guiding route and roads are omitted for convenience.

Step S616 executed by the image processor 110 corresponds to an actual distance calculator for calculating actual distances from the present position to the route direction change positions presented by the meandering arrows 124, 126. For calculating an actual distance, first, a reference scale 130 is detected from the present position map. The reference scale 130 corresponds to an actual distance reference scale. As shown in FIG. 5, the reference scale 130 includes a unit value 131 indicative of an actual unit distance (200 meters in FIG. 5) and a line segment 132 corresponding to the unit value. The following will describe calculation of the actual distance. First, the distance from the present position mark 122 to the route direction change position on the present position map is divided by a length of the line segment 132 in order to calculate a distance to line segment ratio. The route direction change position (normally an intersection of a road) is located around the meandering arrow 124, 126. Then, the actual distance from the present position to the route direction change position, which is located around the meandering arrow 124, 126, is calculated by multiplying the unit value 131 indicative of the actual distance by the calculated distance to line segment ratio. Alternatively, the route direction change mark, i.e., the meandering arrow 124, 126, may be used for calculating an approximate actual distance from the present position mark 122 to the meandering arrow 124, 126 instead of the route direction change position.

Figure 6:
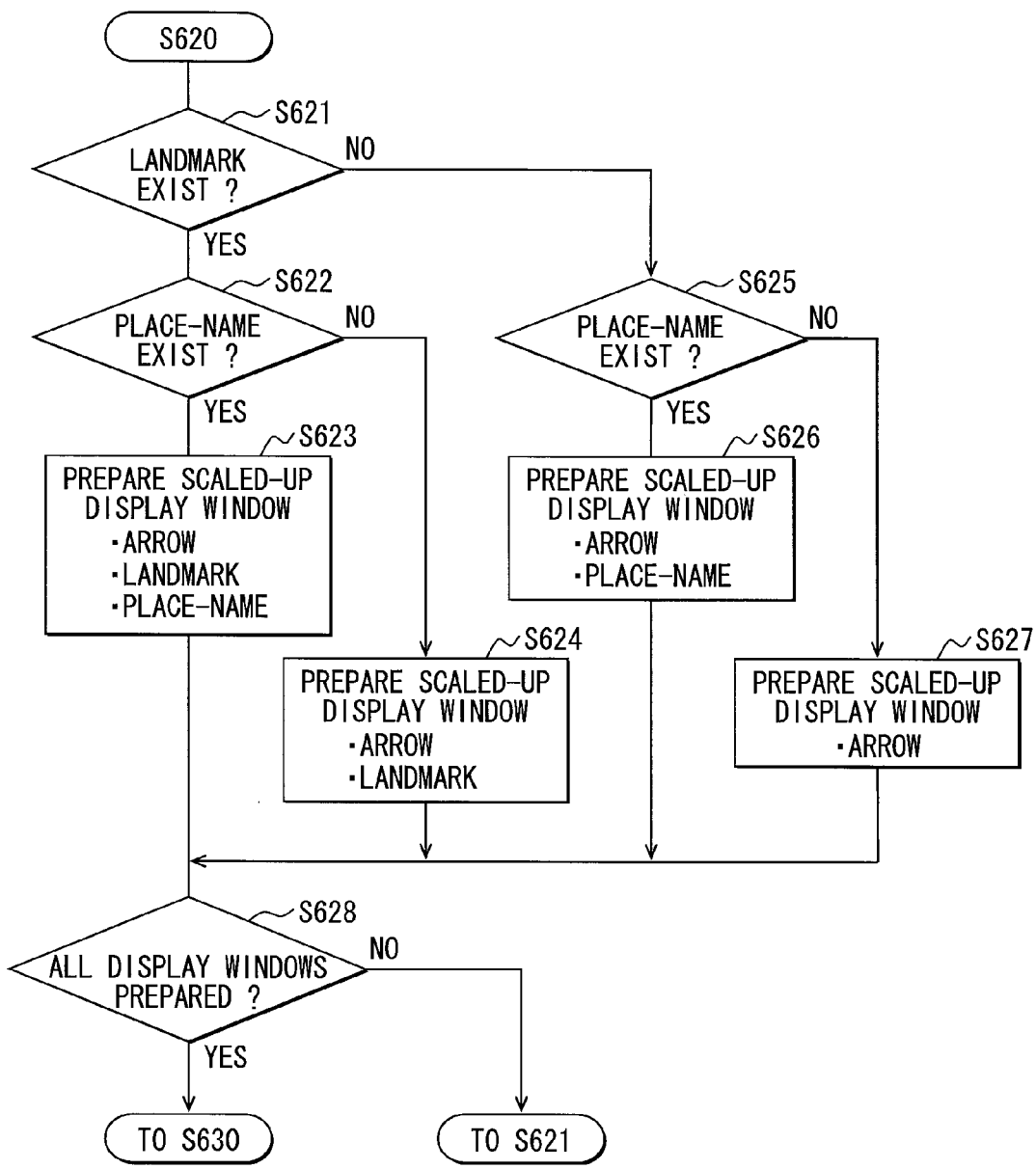
FIG. 6 is a flowchart showing a detailed image preparation process executed at step S620 of FIG. 4.

At step S620, the image processor 110 executes an image preparation process. Specifically, the image processor 110 prepares the one or more sub display windows of the scaled-up specified region display window selected at step S614. Details of step S614 are shown in FIG. 6.

First, at step S621, the image processor 110 selects one of the one or more sub display windows of the scaled-up specified region display window selected at step S614. Then, the image processor 110 determines whether a landmark (i.e., a facility mark) exists around the meandering arrow, which defines the scaled-up specified region display window. Similar to the identification of the meandering arrow, first, the landmark is stored in the scale-up mark list so that the landmark is detected at the image identification process of step S2. Then, at step S621, the existence of the landmark is determined by determining whether the landmark is detected at the image identification process of step S2. As shown in FIG. 5, as an example of the landmark, a convenience store mark 134 is displayed near the meandering arrow 124. Alternatively, other landmarks other than the landmark shown in FIG. 5, for example, a specific name of a convenience store and the like may be stored in the scale-up mark list so that various kinds of landmarks are detected at step S2.

When determining an existence of the landmark, it proceeds to step S622. Further, when determining a non-existence of the landmark, it proceeds to step S625. At step S622, the image processor 110 further determines whether the characters of the place-name exist around the meandering arrow, which defines the scaled-up specified region display window. At this step, the existence of the landmark in the scaled-up specified region display window is already determined. The following will describe the determination whether the characters of the place-name exist according to the present embodiment. The characters of the place-name around the meandering arrow are displayed on the terminal display window of the mobile terminal 10 surrounded by a frame having a predetermined color. The frame having the predetermined color is stored in the scale-up mark list so that the frame is detected at the image identification process of step S2. Further, the image processor 110 may determine whether the characters of the place-name exist around the meandering arrow by an optical character recognition (OCR) technology. When determining an existence of the characters, the image processor 110 may determine that the characters of the place-name exist.

At step S622, when the characters of the place-name are determined to being existed, it proceeds to step S623. Further, when the characters of the place-name are determined to being not existed, it proceeds to step S624. An execution of step S623 indicates that the landmark and the characters of the place-name exist around the meandering arrow. Thus, at step S623, the scaled-up specified region display window including the meandering arrow, the landmark and the characters of the place-name around the meandering arrow is prepared. The meandering arrow included in the scaled-up specified region display window is displayed in a predetermined size. Further, the actual distance calculated at step S616 is displayed in the scaled-up specified region display window.

In FIG. 5, the two sub display windows of the scaled-up specified region display window are displayed on a right side of the entire pseudo terminal display window 120 with no overlap. The scaled-up specified region display window displayed on a lower side shows an example of the scaled-up specified region display window prepared at step S623. In the entire pseudo terminal display window 120, characters of the place-name "TOWN A" is displayed on an upper-left side of the meandering arrow 124. In contrast, in the lower scaled-up specified region display window, the characters of the place-name "TOWN A" is displayed on a right side of the meandering arrow 124. That is, the scaled-up specified region display window may be prepared by rearranging and scaling up the entire pseudo terminal display window 120 other than merely scaling up the entire pseudo terminal display window 120. Alternatively, the scaled-up specified region display window may be prepared to have the same arrangement with the entire pseudo terminal display window 120. In a case where the entire pseudo terminal display window 120 is rearranged, only scale-up mark other than a surrounding (background) is extracted. In a case where the entire pseudo terminal display window 120 is not rearranged, the scaled-up specified region display window may be prepared by merely scaling up a part of the entire pseudo terminal display window 120 including the scale-up mark, other than extracting only the scale-up mark.

The following will describe a process executed at step S624. An execution of step S624 indicates that the landmark exists around the meandering arrow and the characters of the place-name do not exist around the meandering arrow. Thus, at step S624, the scaled-up specified region display window including the meandering arrow and the landmark around the meandering arrow is prepared. Further, the actual distance calculated at step S616 is displayed in the scaled-up specified region display window.

The following will describe a process executed at step S625. The process executed at step S625 is similar to a process executed at step S622 described above. That is, when the landmark does not exist around the meandering arrow, an existence of the characters of the place name around the same meandering arrow is determined.

At step S625, when the characters of the place-name are determined to be existed, it proceeds to step S626. Further, when the characters of the place-name are determined to be not existed, it proceeds to step S627. An execution of step S626 indicates that the characters of the place name exist around the meandering arrow and the landmark does not exist around the meandering arrow. Thus, at step S626, the scaled-up specified region display window including the meandering arrow and the characters of the place-name around the meandering arrow is prepared. Further, the actual distance calculated at step S616 is displayed in the scaled-up specified region display window.

As shown in FIG. 5, the scaled-up specified region display window displayed on an upper side shows an example of the scaled-up specified region display window prepared at step S626. In the upper scaled-up specified region display window, characters of a place name "TOWN B" are rearranged. Needless to say, the scaled-up specified region display window may be prepared to have the same arrangement with the entire pseudo terminal display window 120.

The following will describe a process executed at step S627. An execution of step S627 indicates that characters of the place name and the landmark does not exist around the meandering arrow. Thus, at step S627, the scaled-up specified region display window including the meandering arrow and the actual distance calculated at step S616 is prepared.

When any one of step S623, step S624, step S626, and step S627 is executed, it proceeds to step S628. At step S628, the image processor 110 determines whether all the sub display windows of the scaled-up specified region display window selected at step S614 are prepared. When a determination at step S628 is "NO", the process returns to step S621 and executes processes after step S621 in order to prepare a next scaled-up specified region display window. When the determination at step S628 is "YES", a subroutine shown in FIG. 6 is ended and it proceeds to step S630 in FIG. 4.

At step S630 in FIG. 4, the image processor 110 displays the one or more sub display windows of the scaled-up specified region display window prepared at step S620 in the available region of the display section 112.

The above description with reference to FIG. 4 to FIG. 6 is about an example in which the meandering arrow, the landmark, and the characters of the place-name are set to be displayed in the scaled-up specified region display window. As described above, the display of the scale-up mark is settable by the user. For example, the user may only set the meandering arrow to be displayed as the scale-up mark in the scaled-up specified region display window so that the landmark and the characters of the place-name are not displayed.

Further, in the present embodiment, the size of the sub display window of the scaled-up specified region display window is defined by the number of the mark items of the scale-up mark and the types of the scale-up mark to be displayed in one sub display window of the scaled-up specified region display window. When the scale-up mark is set to the meandering arrow only, the size of the one sub display window of the scaled-up specified region display window decreases, and accordingly, the number of the sub display windows of the scaled-up specified region display window to be displayed in the available region increases.

Figure 7:
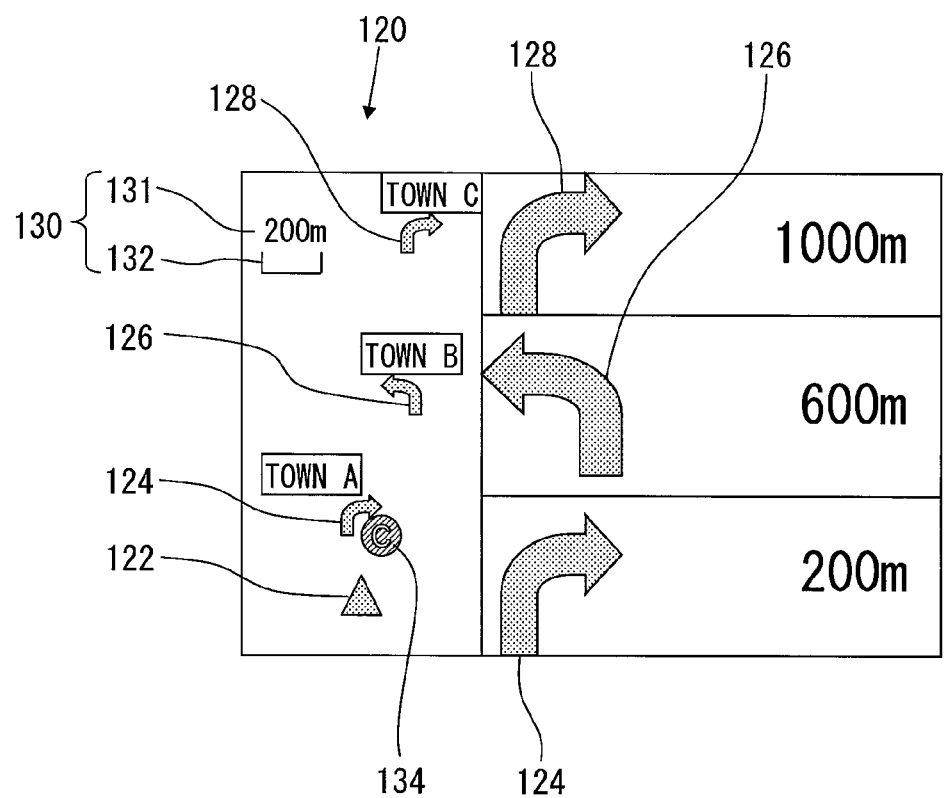
FIG. 7 is a diagram showing the display section 112 in a case where only meandering arrows are displayed as a scale-up mark.

In FIG. 7, an example of the display section 112 in a case where the scale-up mark shown in the scaled-up specified region display window is set to the meandering arrow only. As shown in FIG. 7, the entire pseudo terminal display window 120 and the size of the available region are the same with FIG. 5. Thus, when the scale-up mark shown in the scaled-up specified region display window is set to the meandering arrow only, the three sub display windows of the scaled-up specified region display window defined by the meandering arrows 124, 126, 128, respectively, are displayed on the display section 112. Further, the actual distances to the route direction change positions are displayed on each sub display window of the scaled-up specified region display window.

As described above in the second embodiment, when the terminal display window is the present position map (step S604: "YES") and the guiding route exists (step S608: "YES"), the number of the sub display windows of the scaled-up specified region display window able to be displayed in the available region of the display section 112 is calculated. Then the sub display windows of the scaled-up specified region display window able to be displayed in the available region are selected in ascending order of the distance from the present position to the route direction change position in the traveling direction (step S614, step S620, step S630). During a route guidance, the user is more likely to see details in the traveling direction of the guiding route around the present position. Thus, with the above-described configuration according to the second embodiment, a possibility of displaying the scaled-up specified region display window according to needs of the user is increased.

Further, in the second embodiment, the reference scale 130 is detected from the present position map. Then, the actual distance from the present position to the route direction change position is calculated according to the reference scale 130 (step S616). Then, the calculated actual distance is displayed in the scaled-up specified region display window. By this configuration, when the present position map does not display the actual distance from the present position to the route direction change position, the user is able to know the actual distance from the present position to the route direction change position assisted by the scaled-up specified region display window.

Further, the scaled-up specified region display window may be configured to include the landmark and the characters of the place-name existed around the meandering arrow. Thus, the user can easily identify the route direction change position in an actual road assisted by the scaled-up specified region display window.

Further, the landmark and the characters of the place-name around the meandering arrow are settable by the user whether to being displayed in the scaled-up specified region display window or not. Thus, the user can obtain more details around the route direction change position by setting more types of the scale-up mark existing around the meandering arrow. In contrast, when the user set less types of the scale-up mark displayed in the scaled-up specified region display window, a route direction change position located at a further distance can be displayed by the scaled-up specified region display window in the available region of the display section.

While as described above, embodiments of the present disclosure are described, it is to be understood that the disclosure is not limited to the forgoing embodiments. The following embodiments to be described are also included in a technical scope of the present disclosure. Further, the present disclosure is intended to cover various modification and equivalent arrangements other than the following embodiments to be described.

For example, whether to scale-up the specified region may be settable by the user. Further, when displaying the pseudo terminal display window, the user may select a display manner between step S6 and step S7.

Further, in the forgoing embodiments, the mobile terminal 10 is configured to display the specified region defined by the scale-up mark in the predetermined color and shape. Alternatively, the mobile terminal 10 may display the specified region with no special processing.

Further, in the forgoing embodiments, the scale-up mark is identified according to pixel information and the specified region is identified according to the scale-up mark. Alternatively, the mobile terminal 10 may transmits a command that defines the specified region with the pixel information with the pixel information. Then, the in-vehicle display apparatus 100 may be configured to identify the specified region according to the command transmitted from the mobile terminal 10.

Further, in the second embodiment, the scaled-up specified region display window is limited to include the meandering arrow. Alternatively, other types of the scale-up mark may be displayed in the scaled-up specified region display window. For example, a scale-up mark irrespective of the route guidance may be displayed in the scaled-up specified region display window. In this case, a scale-up mark other than the scale-up mark around the meandering arrow may be scaled up and displayed in a scaled-up specified region display window. In this case, when selecting and displaying the sub display windows of the scaled-up specified region display window in ascending order of the distance from the present position to the route direction change position, it is difficult to define a scope of the traveling direction of the guiding route. Thus, the traveling direction of the guiding route may be defined to include, for example, a point having a minimum distance less than a predetermined distance to the traveling direction. Moreover, the traveling direction of the guiding route may also be defined to include a range from plus alpha degrees to minus alpha degrees when the original traveling direction is defined as zero degree.

Further, in a case where only the present position map is displayed without the guiding route, the sub display windows of the scaled-up specified region display window may be selected as the following. In this case, although the guiding route is not displayed, a present traveling direction can be decided. Thus, the sub display windows of the scaled-up specified region display window may be selected according to the present traveling direction. Further, the sub display windows of the scaled-up specified region display window may also be selected in ascending order of the distance from the present position to a position shown by each mark item of the scale-up mark.

Further, in the second embodiment, the size of the sub display window of the scaled-up specified region display window is defined by the number of the mark items and the types of the scale-up mark. Alternatively, the size of the sub display window of the scaled-up specified region display window may be defined only by the number of the mark items of the scale-up mark. Alternatively, the sub display window of the scaled-up specified region display window may be set to have a predetermined size irrespective of the number of the mark items and the types of the scale-up mark.

The above disclosure has the following aspects.

According to an aspect of the present disclosure, an in-vehicle display apparatus includes an in-vehicle display section equipped to a vehicle and a display controller. The display controller controls the in-vehicle display section to display a pseudo terminal display window, which indicates a terminal display window displayed on the terminal display section of the terminal device. The display controller controls the in-vehicle display section to display the pseudo terminal display window, which includes a specified region and another region other than the specified region, in such a manner that the specified region is scaled up compared with the another region.

In the above apparatus, the pseudo terminal display window is displayed on the in-vehicle display section in such a manner that the specified region is scaled up compared with the another region. Thus, the specified region is confirmed easily. Further, the another region has a smaller scale factor than a scale factor of the specified region. Thus, comparing with a case where the entire region of the terminal display window is scaled up, the pseudo terminal display window displays a broader scope of the terminal display window, thereby reducing a display loss of necessary information. Further, it is a well known technology that a terminal display window of a terminal device can be displayed on a display section of an in-vehicle apparatus and the terminal device can be operated by manipulating the in-vehicle apparatus (i.e., manipulating a touch panel) even when an application program of the terminal device is not installed to the in-vehicle apparatus. A standard, for example, a terminal mode is based on this technology. In the terminal mode, the in-vehicle apparatus can utilize functions of the terminal device even when the application program of the terminal device is not installed to the in-vehicle apparatus. Thus, a processing load of the in-vehicle apparatus is reduced. Further, in the terminal mode, the terminal device basically transmits only color information of each pixel (pixel information) to the in-vehicle display apparatus.

Alternatively, the in-vehicle display apparatus may further includes a mark detector that obtains pixel information of the terminal display window from the terminal device in a sequential manner, and detects at least one of a predetermined mark and a predetermined color preliminarily stored as a scale-up mark from the terminal display window according to the pixel information. The display controller may control the in-vehicle display section to display the pseudo terminal display window according to the pixel information and to display the specified region, which is defined by the scale-up mark detected by the mark detector, in a scale-up manner. In this case, when the terminal device is in the terminal mode and transmits only pixel information, the pseudo terminal display window can be partially scaled up.

Alternatively, the in-vehicle display apparatus may further include an image contents determination device that determines whether the terminal display window indicates a present position map, which includes information of a present position of the vehicle. The display controller may control the in-vehicle display section to display an entire pseudo terminal display window, which indicates an entire region of the terminal display window. The display controller may further control the in-vehicle display section to display a scaled-up specified region display window, which indicates the specified region defined by the scale-up mark detected by the mark detector, in an available region, which is not overlapped with the entire pseudo terminal display window in the in-vehicle display section. The scaled-up specified region display window may be prepared by scaling-up the specified region in the entire pseudo terminal display window to be larger than the specified region in the entire pseudo terminal display window. The scaled-up specified region display window may include one or more sub display windows respectively corresponding to one or more specified regions. When the image contents determination device determines that the terminal display window indicates the present position map, the display controller may control the in-vehicle display section to display each of the one or more sub display windows in a predetermined size, in the available region of the in-vehicle display section, which is not overlapped with the entire pseudo terminal display window, and in ascending order of a distance from the present position of the vehicle to a position indicated by the each of the one or more sub display windows. Generally, when the terminal display window displays the present position map, the user is more likely to see details of a region adjacent to the present position. With this configuration, a possibility of displaying the scaled-up specified region display window according to needs of the user is increased.

Alternatively, when the image contents determination device determines that the terminal display window indicates the present position map, the image contents determination device may further determine whether the present position map includes a guiding route. When the image contents determination device determines that the present position map includes the guiding route, the display controller may control the in-vehicle display section to display the each of the one or more sub display windows in the predetermined size, in the available region of the in-vehicle display section, which is not overlapped with the entire pseudo terminal display window, and in ascending order of the distance from the present position of the vehicle to the position indicated by the each of the one or more sub display windows along a traveling direction of the guiding route. Generally, during a route guidance, the user is more likely to see details in the traveling direction of the guiding route around the present position. With this configuration, a possibility of displaying the sub display windows of the scaled-up specified region display window according to the needs of the user is increased.

Alternatively, the in-vehicle display apparatus may further include an actual distance calculator that calculates an actual distance from the present position of the vehicle to an actual position corresponding to the scale-up mark. When the image contents determination device determines that the terminal display window indicates the present position map and the present position map includes the guiding route, the actual distance calculator may detect an actual distance reference scale indicative of an actual unit distance from the present position map. The actual distance calculator may calculate the actual distance from the present position of the vehicle to the actual position corresponding to the scale-up mark based on the actual distance reference scale detected from the present position map and a distance from the present position of the vehicle to the scale-up mark in the present position map. In this case, the user is notified of the actual distance from the present position to the actual position corresponding to the scale-up mark by confirming the actual distance displayed on the scaled-up specified region display window, even when the actual distance from the present position to the actual position corresponding to the scale-up mark is not displayed in the present position map.

Alternatively, the mark detector may detect a route direction change mark as the scale-up mark. The route direction change mark may indicate a route direction change position of the guiding route and may be located on the guiding route or around the guiding route. The actual distance calculator may calculate an actual distance from the present position of the vehicle to an actual position corresponding to the route direction change mark based on the actual distance reference scale detected from the present position map and a distance from the present position of the vehicle to the route direction change mark in the present position map. The display controller may display, on the scaled-up specified region display window, the actual distance from the present position of the vehicle to the actual position corresponding to the route direction change mark. In this case, the user is notified of the actual distance from the present position to the route direction change position by confirming the actual distance displayed on the scaled-up specified region display window.

Alternatively, the mark detector may further detect a route direction change position periphery mark as the scale-up mark. The route direction change position periphery mark may exist around the route direction change mark and may assist a user to identify a correspondence between an actual position corresponding to the route direction change position in an actual road and the route direction change mark in the present position map. The display controller may display the route direction change mark and the route direction change position periphery mark on the scaled-up specified region display window. In this case, the route direction change mark and the route direction change position periphery mark are displayed together on the scaled-up specified region display window. Thus, the user can easily identify the actual position, which corresponds to the route direction change position, in the actual road assisted by the scaled-up specified region display window.

Alternatively, a type of the route direction change position periphery mark, which is displayed on the scaled-up specified region display window controlled by the display controller, may be settable by the user. The predetermined size of the each of the one or more sub display windows may be defined by the number of the route direction change position periphery marks. In this case, when the route direction change position periphery marks to be displayed in the scaled-up specified region display window are set to have a small number of types by the user, the predetermined size of the each of the one or more sub display windows is decreased. Thus, the number of the sub display windows of the scaled-up specified region display window is increased when the available region has a predetermined size. Further, in a case where the user expects displaying a route direction change position located at a greater distance rather than detailed information around a route direction change position adjacent to the present position, in the scale-up manner, the user may set the route direction change position periphery mark to have the small number of types so that the route direction change position located at the greater distance is displayed in the scale-up manner in the available region of the display section of the in-vehicle display apparatus.

Alternatively, the display controller may display an entire pseudo terminal display window, which is prepared by multiplying an entire region of the terminal display window by a predetermined scale factor. The display controller may further display a scaled-up specified region display window in a region, which is not overlapped with the entire pseudo terminal display window. The scaled-up specified region display window may be prepared by scaling-up the specified region displayed in the entire pseudo terminal display window to be larger than the specified region displayed in the entire pseudo terminal display window. In this case, the scaled-up specified region display window is displayed separately from the entire pseudo terminal display window. Thus, in the entire pseudo terminal display window, an invisibility of a region around the specified region caused by the scaled-up specified region display window is avoided. Further, the specified region in the entire pseudo terminal display window is scaled up by the same scale-up factor with the region other than the specified region in the entire pseudo terminal display window. Thus, a corresponding specified region of the scaled-up specified region display window is easy to be identified in the entire pseudo terminal display window.

Alternatively, the display controller may display an entire pseudo terminal display window, which is prepared by multiplying an entire region of the terminal display window by a predetermined scale factor. The display controller may further display a scaled-up specified region display window in a region, which is overlapped with the entire pseudo terminal display window. The scaled-up specified region display window may be prepared by scaling-up the specified region displayed in the entire pseudo terminal display window to be larger than the specified region displayed in the entire pseudo terminal display window. In this case, a decrease in a display region for displaying windows other than the scaled-up specified region display window is suppressed compared with a case where the scaled-up specified region display window is displayed having no overlap with the entire pseudo terminal display window.

Alternatively, the in-vehicle display apparatus may further include a storage that preliminarily stores the predetermined mark as the scale-up mark. The mark detector may detect the predetermined mark, which is stored as the scale-up mark, based on a color change defined by the pixel information. In this case, when the predetermined mark or the predetermined color is stored as the scale-up mark, the predetermined mark or the predetermined color can be detected according to the pixel information.

Alternatively, the display controller may display the specified region in a predetermined size. Alternatively, the display controller may display the specified region by scaling-up the specified region by a predetermined scale factor.

According to another aspect of the present disclosure, a method for displaying a terminal display window, which has been displayed on a terminal display section of a terminal device, on an in-vehicle display section of an in-vehicle display apparatus coupled to the terminal device includes: obtaining pixel information of the terminal display window transmitted from the terminal display section of the terminal device; identifying a scale-up mark for defining a specified region according to the pixel information; determining whether the scale-up mark is identified according to a result of the identifying of the scale-up mark; determining whether the in-vehicle display section has an available region, when determining that the scale-up mark is identified; displaying an entire pseudo terminal display window, which indicates an entire region of the terminal display window, on the in-vehicle display section of the in-vehicle display apparatus, when determining that the scale-up mark is not identified; displaying the entire pseudo terminal display window, which indicates the entire region of the terminal display window, on the in-vehicle display section of the in-vehicle display apparatus, and displaying a scaled-up specified region display window, which is prepared by scaling-up the specified region displayed in the entire pseudo terminal display window to be larger than the specified region displayed in the entire pseudo terminal display window, in the available region, which is not overlapped with the entire pseudo terminal display window, when determining that the in-vehicle display section of the in-vehicle display apparatus has the available region; and displaying the entire pseudo terminal display window, which indicates the entire region of the terminal display window, on the in-vehicle display section of the in-vehicle display apparatus, and displaying the scaled-up specified region display window, which is prepared by scaling-up the specified region displayed in the entire pseudo terminal display window to be larger than the specified region displayed in the entire pseudo terminal display window, in such a manner that the scaled-up specified region display window is overlapped with the entire pseudo terminal display window, when determining that the in-vehicle display section of the in-vehicle display apparatus does not have the available region.

In the above method, the scaled-up specified region display window is prepared by scaling-up the specified region in the entire pseudo terminal display window to be larger than the specified region in the entire pseudo terminal display window, and is displayed on the in-vehicle display section. Thus, the specified region is confirmed easily. Further, comparing with a case where the entire region of the terminal display window is scaled up by the same scale factor, the pseudo terminal display window displays a broader scope of the terminal display window, thereby reducing a display loss of necessary information.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

The invention claimed is:

1. An in-vehicle display apparatus, which is coupled to a terminal device having a terminal display section, comprising:
an in-vehicle display section equipped to a vehicle; and
a display controller that controls the in-vehicle display section to display a pseudo terminal display window, which indicates a terminal display window displayed on the terminal display section of the terminal device,
a mark detector that obtains pixel information of the terminal display window from the terminal device in a sequential manner, and detects at least one of a predetermined mark and a predetermined color preliminarily stored as a scale-up mark for defining a specified region of the terminal display window according to the pixel information,
an image contents determination device that determines whether the terminal display window indicates a present position map, which includes information of a present position of the vehicle,
wherein the pseudo terminal display window includes an entire pseudo terminal display window, which indicates an entire region of the terminal display window, and a scaled-up specified region display window, which indicates the specified region of the terminal display window,
wherein the display controller controls the in-vehicle display section to display the entire pseudo terminal display window, the entire pseudo terminal display window being converted from the entire region of the terminal display window,
wherein the display controller further controls the in-vehicle display section to display the scaled-up specified region display window in an available region, which is not overlapped with the entire pseudo terminal display window in the in-vehicle display section, the scaled-up specified region display window being prepared by scaling up the specified region displayed in the entire pseudo terminal display window to be larger than the specified region displayed in the entire pseudo terminal display window,
wherein the scale-up mark further includes one or more mark items,
wherein the specified region further includes one or more sub specified regions defined by the one or more mark items, respectively,
wherein the scaled-up specified region display window further includes one or more sub display windows, which correspond to the one or more sub specified regions, respectively, and
wherein, when the image contents determination device determines that the terminal display window indicates the present position map, the display controller controls the in-vehicle display section to display each of the one or more sub display windows:
in a predetermined size;
in the available region of the in-vehicle display section, which is not overlapped with the entire pseudo terminal display window; and
in ascending order of a distance from the present position of the vehicle to a position indicated by each of the one or more sub specified regions.

2. The in-vehicle display apparatus according to claim 1,
wherein, when the image contents determination device determines that the terminal display window indicates the present position map, the image contents determination device further determines whether the present position map includes a guiding route, and
wherein, when the image contents determination device determines that the present position map includes the guiding route, the display controller controls the in-vehicle display section to display the each of the one or more sub display windows:
in the predetermined size;
in the available region of the in-vehicle display section, which is not overlapped with the entire pseudo terminal display window; and
in ascending order of the distance from the present position of the vehicle to the position indicated by the each of the one or more sub display windows along a traveling direction of the guiding route.

3. The in-vehicle display apparatus according to claim 2, further comprising:
an actual distance calculator that calculates an actual distance from the present position of the vehicle to an actual position corresponding to the scale-up mark,
wherein, when the image contents determination device determines that the terminal display window indicates the present position map and the present position map includes the guiding route, the actual distance calculator detects an actual distance reference scale indicative of an actual unit distance from the present position map, and
wherein the actual distance calculator calculates the actual distance from the present position of the vehicle to the actual position corresponding to the scale-up mark based on the actual distance reference scale detected from the present position map and a distance from the present position of the vehicle to the scale-up mark in the present position map.

4. The in-vehicle display apparatus according to claim 3,
wherein the mark detector detects a route direction change mark as the scale-up mark, the route direction change mark indicating a route direction change position of the guiding route and being located on the guiding route or around the guiding route, wherein the actual distance calculator calculates an actual distance from the present position of the vehicle to an actual position corresponding to the route direction change mark based on the actual distance reference scale detected from the present position map and a distance from the present position of the vehicle to the route direction change mark in the present position map, and wherein the display controller displays, on the scaled-up specified region display window, the actual distance from the present position of the vehicle to the actual position corresponding to the route direction change mark.

5. The in-vehicle display apparatus according to claim 4, wherein the mark detector further detects a route direction change position periphery mark as the scale-up mark, the route direction change position periphery mark existing around the route direction change mark and assisting a user to identify a correspondence between an actual position corresponding to the route direction change position in an actual road and the route direction change mark in the present position map, wherein the display controller displays the route direction change mark and the route direction change position periphery mark on the scaled-up specified region display window.

6. The in-vehicle display apparatus according to claim 5, wherein a type of the route direction change position periphery mark, which is displayed on the scaled-up specified region display window controlled by the display controller, is settable by the user, wherein the route direction change position periphery mark includes one or more mark items, wherein the predetermined size of the each of the one or more sub display windows is defined by the number of the one or more mark items of the route direction change position periphery marks.

7. The in-vehicle display apparatus according to claim 1, wherein the display controller controls the in-vehicle display section to display the entire pseudo terminal display window, the entire pseudo terminal display window being prepared by multiplying the entire region of the terminal display window by a predetermined scale factor, wherein the display controller further controls the in-vehicle display section to display the scaled-up specified region display window in the available region, the scaled-up specified region display window being prepared by scaling-up the specified region displayed in the entire pseudo terminal display window to be larger than the specified region displayed in the entire pseudo terminal display window.

8. The in-vehicle display apparatus according to claim 1, further comprising a storage that preliminarily stores the predetermined mark as the scale-up mark, wherein the mark detector detects the predetermined mark, which is stored as the scale-up mark, based on a color change defined by the pixel information.

9. The in-vehicle display apparatus according to claim 1, wherein the display controller controls the in-vehicle display section to display the specified region in a predetermined size.

10. The in-vehicle display apparatus according to claim 1, wherein the display controller controls the in-vehicle display section to display the specified region by scaling-up the specified region by a predetermined scale factor.

11. A method for displaying a terminal display window, which has been displayed on a terminal display section of a terminal device, on an in-vehicle display section of an in-vehicle display apparatus coupled to the terminal device comprising:

obtaining pixel information of the terminal display window transmitted from the terminal display section of the terminal device;

identifying a scale-up mark for defining a specified region according to the pixel information;

determining whether the scale-up mark is identified according to a result of the identifying of the scale-up mark;

determining whether the in-vehicle display section has an available region, when determining that the scale-up mark is identified;

displaying an entire pseudo terminal display window, which indicates an entire region of the terminal display window, on the in-vehicle display section of the in-vehicle display apparatus, when determining that the scale-up mark is not identified;

displaying the entire pseudo terminal display window, which indicates the entire region of the terminal display window, on the in-vehicle display section of the in-vehicle display apparatus, and displaying a scaled-up specified region display window, which indicates the specified region and is prepared by scaling-up the specified region displayed in the entire pseudo terminal display window to be larger than the specified region displayed in the entire pseudo terminal display window, in the available region, which is not overlapped with the entire pseudo terminal display window, when determining that the in-vehicle display section of the in-vehicle display apparatus has the available region; and displaying the entire pseudo terminal display window, which indicates the entire region of the terminal display window, on the in-vehicle display section of the in-vehicle display apparatus, and displaying the scaled-up specified region display window, which indicates the specified region and is prepared by scaling-up the specified region displayed in the entire pseudo terminal display window to be larger than the specified region displayed in the entire pseudo terminal display window, in such a manner that the scaled-up specified region display window is overlapped with the entire pseudo terminal display window, when determining that the in-vehicle display section of the in-vehicle display apparatus does not have the available region.

* * * * *